W. MULLEE.
Combs.
No. 148,738.            Patented March 17, 1874.
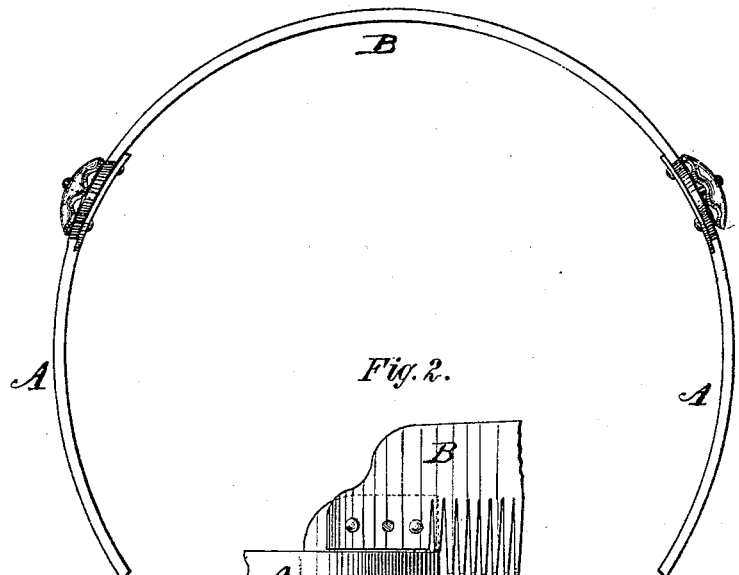
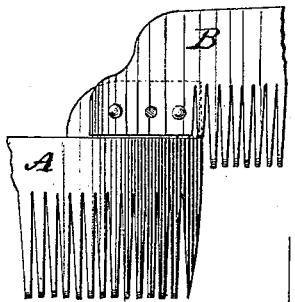
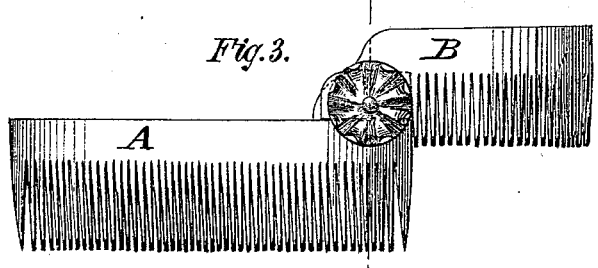
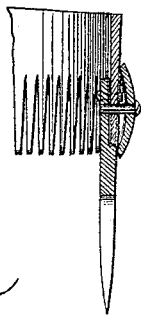
Witnesses.
Joseph Niles
William Osgood
Inventor.
William Mullee

UNITED STATES PATENT OFFICE.

WILLIAM MULLEE, OF LEOMINSTER, MASSACHUSETTS.

IMPROVEMENT IN COMBS.

Specification forming part of Letters Patent No. 148,738, dated March 17, 1874; application filed June 29, 1872.

*To all whom it may concern:*

Be it known that I, WILLIAM MULLEE, of Leominster, in the State of Massachusetts, have invented a certain new and useful Improvement in Combs, known in the trade as long round combs, which improvement has not been known or used before.

The following is a full, clear, and exact description thereof, which will enable others skilled in the manufacture of combs to make and use my invention, reference being had to the accompanying drawings making part of this specification, like letters indicating like parts throughout.

My invention consists in a cheap long round comb, applicable to ladies' as well as children's wear, and may be worn either with or without chignons, or other ornaments of that kind, from its having an offset in the center, by which it is called the "offset-comb."

The offset is formed by the teeth in the middle part of the comb standing back so that their points come in line with the butts of the teeth in the ends.

My comb may be made of any substance from which combs are usually made; but my present invention relates more especially to horn, for the reason that long round combs should be from twelve to thirteen inches long, and to make which from horn is expensive, it being necessary to employ skilled labor, the horns having to be sawed for that purpose in a manner resembling a screw, that they may be opened to the required length.

My invention obviates this difficulty, and also enables me to make a comb of any form or any length from the smallest horns, and without employing workmen of extraordinary skill, and more useful and ornamental, and at less cost, than any long round comb now in use.

To make my comb, say, twelve inches long, from horn, I make one comb six inches long with a lug at each end projecting endwise. I then make two combs three inches long, with lugs at the ends upon the backs of the combs. I form steps upon the lugs of the three-inch combs, reducing them in thickness to receive the lugs of the six-inch comb above mentioned, which are riveted upon them. Thus the six-inch comb becomes the center, and the two three-inch combs become the ends of the new comb above mentioned. The joint where the lugs are riveted may be covered with any ornament.

I prefer to bend each piece into its proper form before riveting, which, from the shortness of the pieces, and the shapes they are to be formed into, may be done in molds, imparting at the same time any ornamentation of embossed work desired, which is impracticable where long round combs are made of one piece of horn. I also prefer to make the teeth in the offset or center of the comb coarser than at the ends, so that, when worn by an adult, the center may be placed upon the back of the head, and answer the purpose of a back-comb.

Figure 1 is a view of the edge or back of the comb complete, showing the lap-joints at the lugs partially covered by a convex ornament. Fig. 2 is an inside view of a section of middle and end combs, showing the lugs lapped and riveted. Fig. 3 is an outside view of end comb attached to a section of middle comb, showing offset and lap of the lugs partially covered by the ornament. Fig. 4 is a sectional view, showing the step upon the lug and a section of ornament, and rivet attaching it upon the lap-joint.

It is obvious that the comb hereinabove described may be made of pieces or combs connected by other contrivances. If made of rubber or metal, the lugs of the middle comb may be made narrow, and simply riveted upon the plate or back of the end combs, thus dispensing with the lugs thereof; but this is not advisable if the middle comb is horn, because of its brittleness and inclination to warp and split.

I find by experiment that much grace and beauty may be imparted by cutting the teeth gradually shorter from the center toward the ends of each comb, which may be done by concaving the line of the butts of the teeth, and convexing the line of the points, or by cutting the teeth in a straight line, and convexing the line of the points by clipping, which may be done with a circling-knife; and also, that the lugs and laps herein described may be used for making long round combs of horn of two or more pieces or combs, and of various shapes; therefore,

What I claim as my invention, and desire to secure by Letters Patent, is—

A comb composed of the pieces A A and B, constructed and arranged substantially as shown and described, as a new article of manufacture.

WILLIAM MULLEE.

Witnesses:
JOSEPH NILES,
WM. F. NILES.